Figure 1:
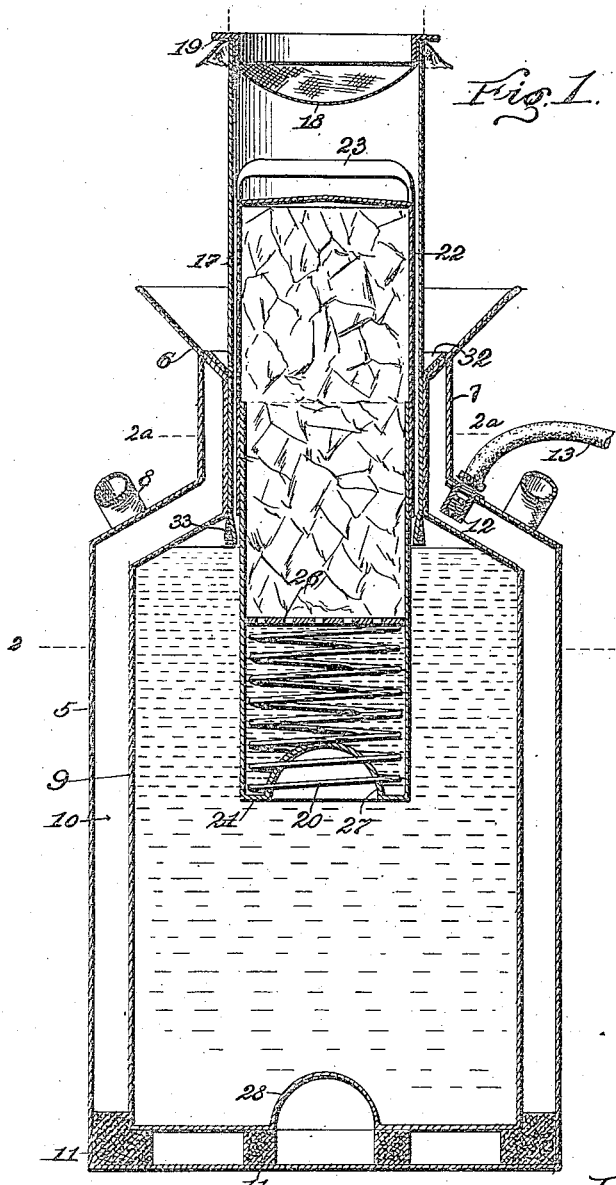

Inventor
Frederick G. Murray
By J. M. St. John
Atty

F. G. MURRAY.
MILK CAN.
APPLICATION FILED OCT. 15, 1919.
1,432,888.
Patented Oct. 24, 1922.
2 SHEETS—SHEET 2.
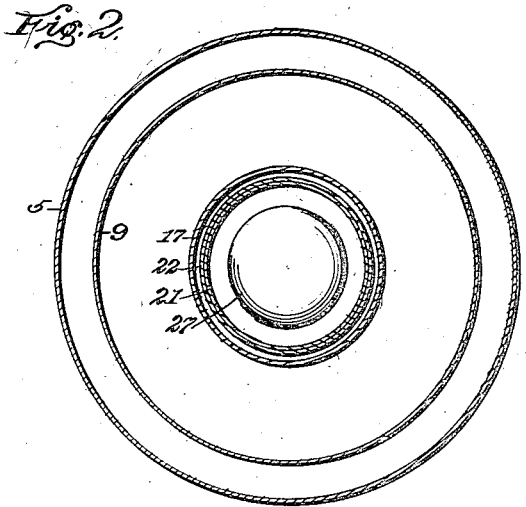
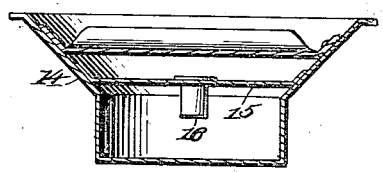
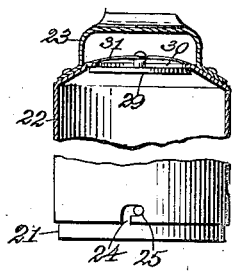
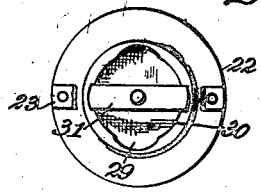
Inventor
Frederick G. Murray.

Patented Oct. 24, 1922.

1,432,888

UNITED STATES PATENT OFFICE.

FREDERICK G. MURRAY, OF CEDAR RAPIDS, IOWA.

MILK CAN.

Application filed October 15, 1919. Serial No. 330,901.

*To all whom it may concern:*

Be it known that I, FREDERICK G. MURRAY, a citizen of the United States, residing at Cedar Rapids, in the county of Linn and State of Iowa, have invented certain new and useful Improvements in Milk Cans; and I do hereby declare the following to be a full, clear, and exact description of the invention, such as will enable others skilled in the art to which it appertains to make and use the same.

This invention relates to the transportation of milk, the object of the invention being to provide a milk receptacle adapted to receive the milk direct from the stable in a clean and sanitary condition; to quickly eliminate the animal heat therefrom, and to maintain a low temperature in the milk as transported and distributed.

The invention consists in various improvements in milk-transportation cans, as fully hereinafter set forth and claimed.

Aside from the fundamental requirement of cleanliness, no step in the management of milk appears to be of greater importance than that of removing the animal heat from it as quickly as possible after extraction from the cow. If it can then be kept at a low temperature bacterial action can be delayed for a maximum length of time. These essentials are at the basis of this invention, and with a view to insuring the delivery, and especially for the use of infants, of a perfectly pure and harmless article of food.

In the accompanying drawings, forming a part of this specification, Fig. 1 is a central, vertical section of a milk-can embodying my improvements. Fig. 2 is a section of the same, below the line 2—2 of Fig. 1. Fig. 3 is a central, vertical section of the cover. Fig. 4 is a fragmentary view, partly sectional, illustrating an ice receptacle modified from that shown in Fig. 1. Fig. 5 is a plan view of the ice-chamber cover, a part of its handle being broken away.

In its general form the external part of the can, 5 is similar to those in common use, having a flaring throat 6, a cylindrical neck 7, and carrying handles 8. The main vessel, however, is provided with an internal one 9, smaller in every dimension, and practically corresponding to the shape of the outer vessel up to the throat, thus leaving a substantially uniform space 10 between the walls of the outer and inner chambers. For the support and protection of the inner chamber at the bottom the can is preferably provided with interposed rings of some elastic material, such as cork, 11, to take the impact of jolts and jars in transportation. In the outer chamber is fitted a valve 12, adapted to connect, as by a hose 13, with an exhaust pump, so that a practical vacuum may be created in this interspace, and thereby the internal temperature may be maintained indefinitely. The valve herein shown is a simple check-valve, and needs no special description.

It will be seen by reference to Fig. 3 that similar provision is made for holding the temperature of the cover, 14, the neck portion of which is closed by a diaphragm 15, provided with a suitable check-valve 16. When the cover, with its vacuum chamber is in the closing position, the inner, milk receptacle is entirely enclosed by a space from which the air has been exhausted.

Fitting neatly, but movably, in the neck is a cylindrical body 17, open at both ends, and serving in the double capacity of guide and strainer, as will presently appear. To its upper end is attached a strainer 18, which in practice is preferably a piece of properly sterilized fabric, held in place by a flanged neatly fitting ring 19. The ring should hold the fabric rather tightly in the cylinder, and the cylinder should fit rather less tightly in the can neck, so that while the cylinder does not slide down by its own weight, it may nevertheless be lifted or depressed by the strainer ring, the operator holding it by its annular flange. The entire strainer apparatus may thus be manipulated without bringing the hands in contact with the milk at any point. The strainer cylinder may be of such length as conditions demand.

Inside the strainer, in Fig. 1, is placed an ice-receptacle. This comprises a cylindrical vessel 21, and a telescoping cover 22 therefor. In practice both are about of the same depth, or approximately so, in order that the ice-can may be collapsed at times, as will be explained presently. The cover has a suitable handle 23, and the cover, when completely depressed, engages the can suitably, as by a notch 24 and stud 25. This makes it possible to manipulate the collapsed can entirely by its handle. The ice-can is also shown provided with means for holding the ice in the top of the can and cover, and mainly out of the water as it melts from the ice, thus prolonging the life of the ice. This comprises a perforate diaphragm 26 and a large coil spring 20 of some suitable non-corrosive material, serving to support the ice, as shown in Fig. 1. When the milk-can is empty the ice-can rests on the bottom thereof, and to prevent undue jostling of the ice a concave 27 of the ice-can fits over a boss 28 of the milk-can, thus holding the parts in steady position, at the bottom. The upper part of the ice-can is meantime held in position by the depressed strainer cylinder.

It is sometimes desirable, as will appear hereafter, to empty the ice-can without removing the cover. For this purpose an improved cover is shown in Figs. 4 and 5. The central portion of the cover top forms inside a seat for a disk 29 to close a hole 30, which is larger in one diameter than in the other, as shown in Fig. 5. To the disk is pivoted a spring 31, whose ends may pass through the larger diameter of the hole, but overlap its margin the other way. A quarter turn of the spring releases the disk, which, with the attached spring falls inside the can.

The apparatus is designed to be used and operated as follows:

The cans are duly cleaned and sterilized at some suitably equipped receiving station, no part of this essential operation being left for the dairyman. The sterilized cans are then iced at the same station, preferably with pure, artificial ice, the filled can and cover being telescoped together like a capsule. The ice-can is placed in the empty milk-can, resting on the bottom, with the depressed strainer cylinder holding its upper end in position the ice-can handle being preferably wrapped with paraffine paper, or the like, as a protection against unclean handling. By limiting the projection of the strainer-ring flange to the outer line of the cylinder, as indicated by the dotted lines in Fig. 1, the strainer may be attached at the same station, the entire strainer and the ice-receptacle being inside the milk-can and under its cover. Otherwise, the strainer fabric may be tucked under such cover, and the strainer ring on top of it, under the handle thereof. In this condition, with air exhausted from the inter-wall spaces, the can reaches the dairy. By the exercise now of but ordinary care the can may be filled with fresh milk from the milking-pails, under practically perfect sanitary conditions.

Two methods of use are contemplated. In one case the ice-receptacle, condensed as much as possible, is returned, inside the milk can with ice or cold water inside, and closed. It is therefore desirable that its bulk may be reduced as much as possible, to give correspondingly more room in the can for milk. The other method is to use the ice-receptacle and its contents for the immediate cooling of the milk, which is poured into the milk-can around it, and then to empty out the water, replace the ice-receptacle, and fill it with milk as well. The latter method may be employed when perfectly pure ice is used, and with practically no sacrifice of room for milk in the can. The tall strainer cylinder makes it possible to do this very easily and conveniently. It provides an upward extension of the milk-can, into which the ice-chamber can rise, as the milk is poured into the can around it, thus permitting the can to be filled up to the neck with milk, exposed all the time to the maximum chilling effect of the ice-chamber. To prevent the escape of milk outside the cylinder a milk-tight gasket such as 32 or 33, of rubber, or the like, may be applied to the throat of the can. The narrow space between the ice-chamber and the cylinder permits the milk to flow down rather slowly, in a thin, annular stream, thus chilling rapidly.

It is to be noted that the mechanism for lifting the ice clear of the water, and so retarding the melting of the ice, is useful mainly prior to the filling of the cans. But while filling the can with milk, it is desirable to cause as rapid melting of the ice as possible, to give the maximum of refrigeration; and accordingly the cover is pressed down to force the ice to the bottom of the chamber and into the water, as above mentioned.

It is intended that the ice-chamber and its connections shall be light enough so that it and its contents may float. The upper end of the ice-chamber, when the milk-can is filled, will thus be in the throat of the can. The position of the parts as shown in Fig. 1 is ideal, rather than actual, with the milk level as indicated. It illustrates, rather, the position of the ice-chamber if the strainer cylinder were nearly full of milk, as described in a preceding paragraph.

Having thus described my invention, I claim:

A double-walled milk-can and cover, substantially as described, adapted for the exhaustion of air from the spaces between the walls, and the can having an elongated, double walled neck, a strainer-tube fitting the inside of said neck, and an ice-receptacle of slightly smaller diameter than said tube and insertable therein, whereby a thin, annular stream of milk is poured into the can between two cold walls, and is instantaneously chilled thereby.

In testimony whereof I affix my signature in presence of two witnesses.

FREDERICK G. MURRAY.

Witnesses:
F. W. ARMSTRONG,
J. M. ST. JOHN.